United States Patent
Kumar et al.

(10) Patent No.: US 10,698,723 B2
(45) Date of Patent: Jun. 30, 2020

(54) DROPPING AN INDEX WITHOUT BLOCKING LOCKS

(71) Applicant: Oracle International Corporation, Redwood Shores, CA (US)

(72) Inventors: Ramesh Kumar, Foster City, CA (US); Ananth Raghavan, San Francisco, CA (US); George Eadon, Hollis, NH (US)

(73) Assignee: Oracle International Corporation, Redwood Shores, CA (US)

( * ) Notice: Subject to any disclaimer, the term of this patent is extended or adjusted under 35 U.S.C. 154(b) by 1525 days.

(21) Appl. No.: 14/231,416

(22) Filed: Mar. 31, 2014

(65) Prior Publication Data
US 2015/0278275 A1 Oct. 1, 2015

(51) Int. Cl.
*G06F 9/46* (2006.01)
*G06F 16/22* (2019.01)
*G06F 16/23* (2019.01)

(52) U.S. Cl.
CPC .............. *G06F 9/466* (2013.01); *G06F 16/22* (2019.01); *G06F 16/2308* (2019.01)

(58) Field of Classification Search
CPC ........... G06F 17/30336; G06F 17/2343; G06F 9/466; G06F 16/22; G06F 16/2308
See application file for complete search history.

(56) References Cited

U.S. PATENT DOCUMENTS

| | | | | |
|---|---|---|---|---|
| 6,115,703 A | * | 9/2000 | Bireley | G06F 17/3048 707/704 |
| 6,260,044 B1 | * | 7/2001 | Nagral | G06F 9/4443 358/1.13 |
| 6,353,828 B1 | * | 3/2002 | Ganesh | G06F 17/30383 |
| 6,834,290 B1 | * | 12/2004 | Pugh | G06F 17/30339 707/803 |
| 7,133,875 B1 | * | 11/2006 | Chatterjee | G06F 16/284 |
| 7,555,493 B2 | * | 6/2009 | Khayter | G06F 16/27 |
| 7,644,106 B2 | | 1/2010 | Shankar et al. | |
| 8,041,691 B2 | | 10/2011 | Raghavan et al. | |
| 8,195,702 B2 | | 6/2012 | Shankar et al. | |
| 8,260,769 B1 | * | 9/2012 | Fuller | G06F 16/2228 707/721 |
| 8,499,001 B1 | * | 7/2013 | To | G06N 3/126 707/741 |
| 2003/0093408 A1 | * | 5/2003 | Brown | G06F 16/2272 |
| 2005/0055384 A1 | * | 3/2005 | Ganesh | G06F 17/30516 |

(Continued)

*Primary Examiner* — Mohammad S Rostami
(74) *Attorney, Agent, or Firm* — Hickman Palermo Becker Bingham LLP; Daniel D. Ledesma

(57) ABSTRACT

Techniques for processing "destructive" database statements are provided. Destructive database statements, when processed, cause metadata of a database object to be changed. Examples of such database statements include ones that delete an index, that set a column as unused, and that drop a constraint on a column. When such a statement is received, a change is made to metadata of a database object. Such a metadata change may involve setting an index as unusable, disabling a constraint, or invalidating a cursor. After the metadata change, a first time is determined. Then, it is determined when one or more database transactions that were pending at the first time have committed. After those database transaction(s) have committed, one or more operations are performed, such as dropping an index or dropping a constraint.

16 Claims, 9 Drawing Sheets

(56) References Cited

U.S. PATENT DOCUMENTS

| | | | |
|---|---|---|---|
| 2005/0203940 A1* | 9/2005 | Farrar | G06F 17/30289 |
| 2006/0074635 A1* | 4/2006 | Gilbert | G06F 16/2438 704/9 |
| 2006/0212496 A1* | 9/2006 | Romine | G06F 17/30604 |
| 2008/0177694 A1* | 7/2008 | Chaudhuri | G06F 17/30463 |
| 2009/0030883 A1* | 1/2009 | Das | G06F 16/24542 |
| 2009/0037366 A1* | 2/2009 | Shankar | G06F 17/30336 |
| 2009/0094291 A1* | 4/2009 | Yalamanchi | G06F 17/30371 |
| 2010/0191884 A1* | 7/2010 | Holenstein | G06F 11/2094 710/200 |
| 2010/0211737 A1* | 8/2010 | Flynn | G06F 3/0616 711/114 |
| 2010/0250504 A1* | 9/2010 | Balasubramanian | G06F 17/30336 707/696 |
| 2013/0110883 A1* | 5/2013 | Junqueira | G06F 17/30353 707/803 |
| 2014/0156619 A1* | 6/2014 | Lee | G06F 17/30289 707/703 |

* cited by examiner

DROPPING AN INDEX WITHOUT BLOCKING LOCKS

CROSS-REFERENCE TO RELATED APPLICATIONS

This application is related to U.S. application Ser. Nos. 11/830,528, 11/830,538, and 11/830,545, each of which were filed on Jul. 30, 2007 and have issued, respectively, as U.S. Pat. Nos. 8,041,691, 7,644,106, and 8,195,702, the entire contents of each which is hereby incorporated by reference as if fully set forth herein.

FIELD OF THE DISCLOSURE

The present disclosure relates to databases, and more particularly to avoiding locks on data when dropping an index or processing other "destructive" DDL statements.

BACKGROUND

In database systems, many resources (such as data blocks, tables, indexes) are shared among multiple processes. Even though resources may be shared, many resources may not be used by more than one process at a given time. For example, sometimes, tables stored on a storage medium may be concurrently accessed in some ways (e.g., read) by multiple processes, but accessed in other ways (e.g., written to) by only one process at a time. As a result, mechanisms have been developed to control access to resources.

One such mechanism uses locks. A lock is a data structure that indicates that a particular process has been granted certain rights with respect to a resource. There are many types of locks, some of which may be shared by many processes, while other types prevent any other locks from being granted on the same resource.

Types of Locks

There are numerous types of locks that may be granted with respect to a particular resource. One type of lock is a shared (S) lock. An S lock on a table grants a process permission to read the table and guarantees that other processes cannot write to the table; however, the S lock does not guarantee that other processes cannot read the table.

Another type of lock is an exclusive (X) lock. An X lock on a table grants a process permission to read from and write to a table and guarantees that other processes cannot read from or write to the table.

Another type of lock is a subexclusive (SX) lock. An SX lock on a table grants multiple processes permission to read from and write to the table, but prevents S locks and X locks from being granted on the table. A common scenario in which a SX lock is used is when multiple processes are affecting different rows of the same table.

Types of Database Statements

There are at least two types of database statements which, when executed, require locks on certain database objects: data manipulation language (DML) statements and data definition language (DDL) statements. Non-limiting examples of DML statements include INSERT, UPDATE, and DELETE. Non-limiting examples of DDL statements include CREATE, DROP, and ALTER. DML statements modify entries (e.g., rows) in tables and indexes while DDL statements define a table or index, such as by adding a column, dropping a partition, or modifying a constraint on a column.

Multiple DML statements are usually included in a single database transaction. The processing of a database statement typically entails parsing (or compiling) the database statement and then executing the database statement. One or more processes that parse and/or execute a database statement acquire locks while the database statement is processed.

A database transaction is a unit of work performed within a database management system (or similar system) against a database and, thus, does not perform any function in and of itself. Nevertheless, the discussion hereinafter, for purposes of brevity, states that a database transaction (or a database statement) performs some function relative to a lock. For example, "a database transaction acquires a lock" is shorthand for "one or more processes that process a database transaction acquire a lock."

In high traffic database systems, it is important to allow multiple DML statements to update a single table concurrently. However, if locks were granted to DML statements on a per-table basis, then only one DML statement would be able to access a table at any instant. Mechanisms have therefore been developed for allowing multiple DML statements to update a single table or index. For example, DML statements may obtain locks at the granularity of a single row of a table in order to allow other DML statements to acquire locks on other rows of the table concurrently.

Dropping an Index

However, some DDL statements require a lock on an entire table or index. One such DDL statement is a statement (e.g., DELETE INDEX) which, when executed, causes an index to be deleted. Once issued, a DELETE INDEX statement "waits" for any DML statements that currently hold locks on the corresponding table to complete before processing of the DELETE INDEX statement begins. Once a table lock is acquired, any DML statements that require a lock on the same table (or on a row of the table) must wait until the DELETE INDEX statement completes.

FIG. 1 is a graph that illustrates the effect on DML activity that DELETE INDEX statements have when issued. At T1, a DELETE INDEX statement is issued. Subsequently, the DELETE INDEX statement must wait until any DML statements that hold locks on the corresponding table to complete. Also, any DML statements (1) that are issued after the DELETE INDEX statement and (2) that require a lock on the corresponding table must wait until the DELETE INDEX statement is executed and releases its lock.

By T2, all DML statements that were issued before the DELETE INDEX statement have completed. Also at T2, the DELETE INDEX statement begins executing. As part of its execution, the DELETE INDEX statement acquires a lock on the table. At T3, the DELETE INDEX statement completes and releases the lock on the table. The period between T3 and T4 indicates an increase in DML activity above the "normal" threshold in order to process the DML statements that were blocked on the DELETE INDEX statement.

In high traffic websites that are supported by one or more underlying database systems, the "dip" (i.e., between T1 and T3) in DML activity is unacceptable because the "dip" indicates that some users are waiting longer for transactions to complete than such users normally would wait. Thus, overall user experience suffers, which may result in some users choosing to visit other websites. Furthermore, a database system may not have enough resources to process the backlogged DML statements in addition to the DML statements that are received in the normal course of business, which may cause additional delays in processing the DML statements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to techniques described herein, "destructive" database instructions are processed without acquiring locks that block database transactions. Database instructions may come in the form of statements, such as DDL statements. Examples of "destructive" DDL statements include delete index, set column unused, and drop constraint. Processing such statements within a database transaction may involve setting any indexes (e.g., associated with a column that is to be set unused) as unusable and/or disabling a constraint. After the metadata is modified, a timestamp is identified and the database transaction waits until all transactions (or all transactions that are associated with the target index/column/constraint) that began before the time indicated by the timestamp have committed. Once it is determined that those transactions have committed, the index and/or any constraints are dropped.

Database Transactions

A database statement is executed in the context of a database transaction. When a database transaction completes (i.e., commits), any changes to database objects and/or metadata of the database objects are made visible to other database server processes.

Multiple DML statements are usually included in a single database transaction, whereas a database transaction that includes a DDL statement usually includes no other types of database statements. A database transaction that includes one or more DML statements is referred to hereinafter as a "DML transaction." A database transaction that includes a DDL statement (such as a DELETE INDEX statement) is referred to hereinafter as a "DDL transaction."

Example Process

Figure 2:
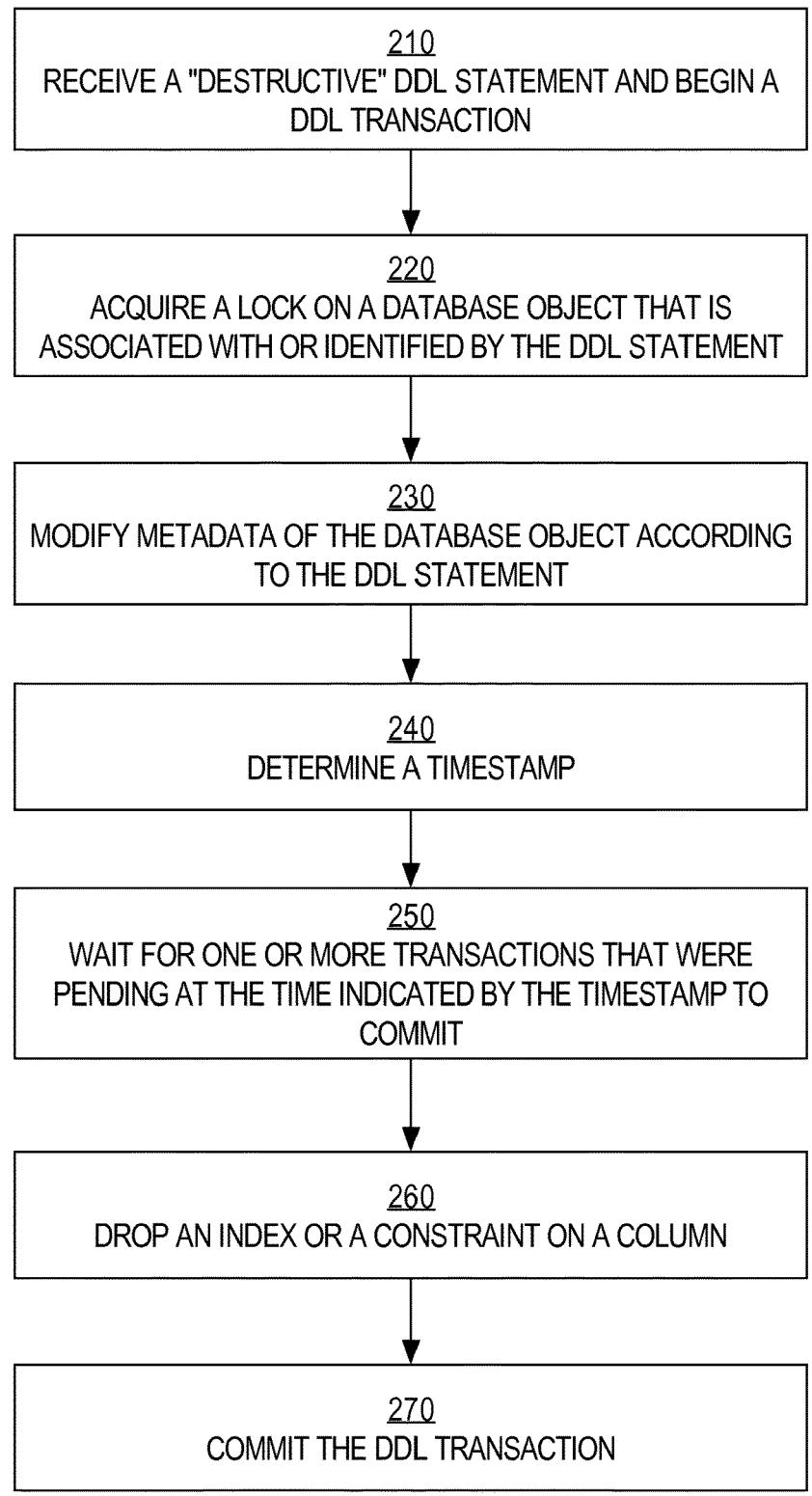
FIG. 2 is a flow diagram that depicts a process for processing a destructive DDL statement without requiring any locks that would block DML transactions, in an embodiment.

FIG. 2 is a flow diagram that depicts a process 200 for processing a destructive DDL statement without requiring any locks that would block DML transactions, in an embodiment. Process 200 may be performed by a database server process that is executing within a database management system.

At block 210, a destructive DDL statement is received and a DDL transaction begins.

At block 220, a lock is acquired on a database object that is associated with or identified by the DDL statement. For example, the DDL statement identifies a table, a column of the table, and a particular constraint (of the column) that is to be disabled.

At block 230, metadata of the database object is modified. Examples of metadata include an index usability setting that indicates whether an index on the database object (e.g., a table) is usable, a constraint setting that indicates whether a constraint of a column of the table is enabled, and a column usability setting that indicates whether a column is usable. One or more of these settings may be modified in block 230. The metadata may reside in table definition data that defines attributes of one or more tables.

Block 230 may be part of a second database transaction (also referred to as a "recursive" transaction) that is within the DDL transaction that began at block 210. Thus, the ending of block 230 may involve committing the second database transaction.

After block 230, transactions that begin after the modified metadata is made "visible" will use the modified metadata and proceed accordingly. For example, if the metadata now indicates that an index is deleted or unusable, an execution plan generator will not generate an execution plan that involves the index. However, transactions that began before the modified metadata is made visible will use the previous version of the metadata.

At block 240, a timestamp is determined. The timestamp is associated with a particular time at which (or after which) block 230 ended. Thus, the timestamp may indicate when block 230 completed. A timestamp may comprise a date and time that includes milliseconds or microseconds. Alternatively, a timestamp may be a monotonically increasing number, such as a sequence change number (SCN) that no two transactions that might execute concurrently share.

At block 250, the DDL transaction "waits" for one or more transactions that were pending at the particular time (associated with the timestamp) to commit. Such transactions may be all concurrent transactions or only those that involve the database object.

"Waiting" may involve analyzing transaction data that indicates a number of transactions and associated timestamp for each transaction. The transaction data may store data about committed transactions, such as an end timestamp associated with each committed transaction. Alternatively, the transaction data only includes information about pending transactions. Thus, if a transaction commits, then data about that transaction is removed from the transaction data.

If the transaction data indicates that there is at least one pending transaction that began before the timestamp (determined in block 240), then the DDL transaction continues to "wait" until all pending transactions that began before the timestamp have committed. Alternatively, if the transaction data indicates that no transaction that involves the database object is currently pending, then process 200 proceeds to block 260, even though there may be other transactions that are pending that began before the timestamp.

In an embodiment, "waiting" is initiated by (in the context of the DDL transaction) calling a function that takes, as input, the timestamp (e.g., a SCN) determined in block 240 and an object identifier that identifies the database object (e.g., table) that is associated with the DDL statement.

One or more transactions that modify the database object may have started prior to block 230 and not yet completed. Such transactions may involve execution plans that were generated based on the state of the database object prior to the committing of the recursive transaction of block 230. Such transactions should see a consistent view of the database object before any modifications to the database object are made. Otherwise, errors may arise. Therefore, block 260 is not performed until block 250 is complete.

At block 260, an index and/or a constraint on a column is dropped. For example, if the DDL statement is a DELETE INDEX statement, then block 260 involves dropping an index indicated by the DELETE INDEX statement. As another example, if the DDL statement is a DROP CONSTRAINT statement, then block 260 involves dropping a constraint indicated by the DROP CONSTRAINT statement. As another example, if the DDL statement is a SET COLUMN UNUSED statement, then block 260 may involve dropping an index (if one exists) on the column indicated in the SET COLUMN UNUSED statement and/or dropping a constraint (if one exists) of the column.

At block 270, the DDL transaction that began in block 210 commits.

Process 200 is performed without acquiring any locks that would block DML transactions from accessing the database object (e.g., table) that is associated with the DDL transaction. For example, the DDL transaction obtains an SX lock on a table, which lock does not prevent currently pending DML transactions from modifying rows in the table. In this way, no DML transactions are blocked while a change to metadata or a dropping of an index occurs. DML transactions that have been compiled with a certain version of the metadata will "see" that version of the metadata during execution. Similarly, DML transactions that have been compiled after the change in the metadata (e.g., dropping a constraint) has been made will proceed in light of that change.

Invalidating Cursors

In an embodiment, block 230 involves invalidating any cursors that target the database object. A cursor is a data structure that stores a database statement and an execution plan for the database statement. A cursor is useful if a database statement (e.g., a query) that is identical (or semantically equivalent) to a previous database statement can use the cursor that was generated for the previous database statement during a compilation phase. Compiling a database statement requires a non-trivial amount of time and resource. Thus, "sharing a cursor" allows the compilation phase of processing to be skipped altogether for an identical or equivalent subsequent database statement.

"Invalidating" a cursor causes the cursor to be unusable for subsequent database statements. For example, the cursor is deleted altogether or a flag is set that indicates that the cursor should not be shared. If a cursor associated with the database object is not invalidated, then a database statement that begins after block 260 may attempt to use that cursor, which may indicate that, for example, an index that was dropped can be used. During execution of that cursor, an attempt to access the index will be made and an error will occur. Such an error may cause all the changes of the database statement up to that point to be undone. As another example, a cursor may refer to a column that has just been made unusable. If a subsequent statement shares the cursor and attempts to access the column, then an error arises. To avoid such errors, relevant cursors (i.e., cursors that rely on metadata or database objects that have changed, or are about to change, as a result of the DDL transaction) are invalidated.

Delete Index

Figure 3:
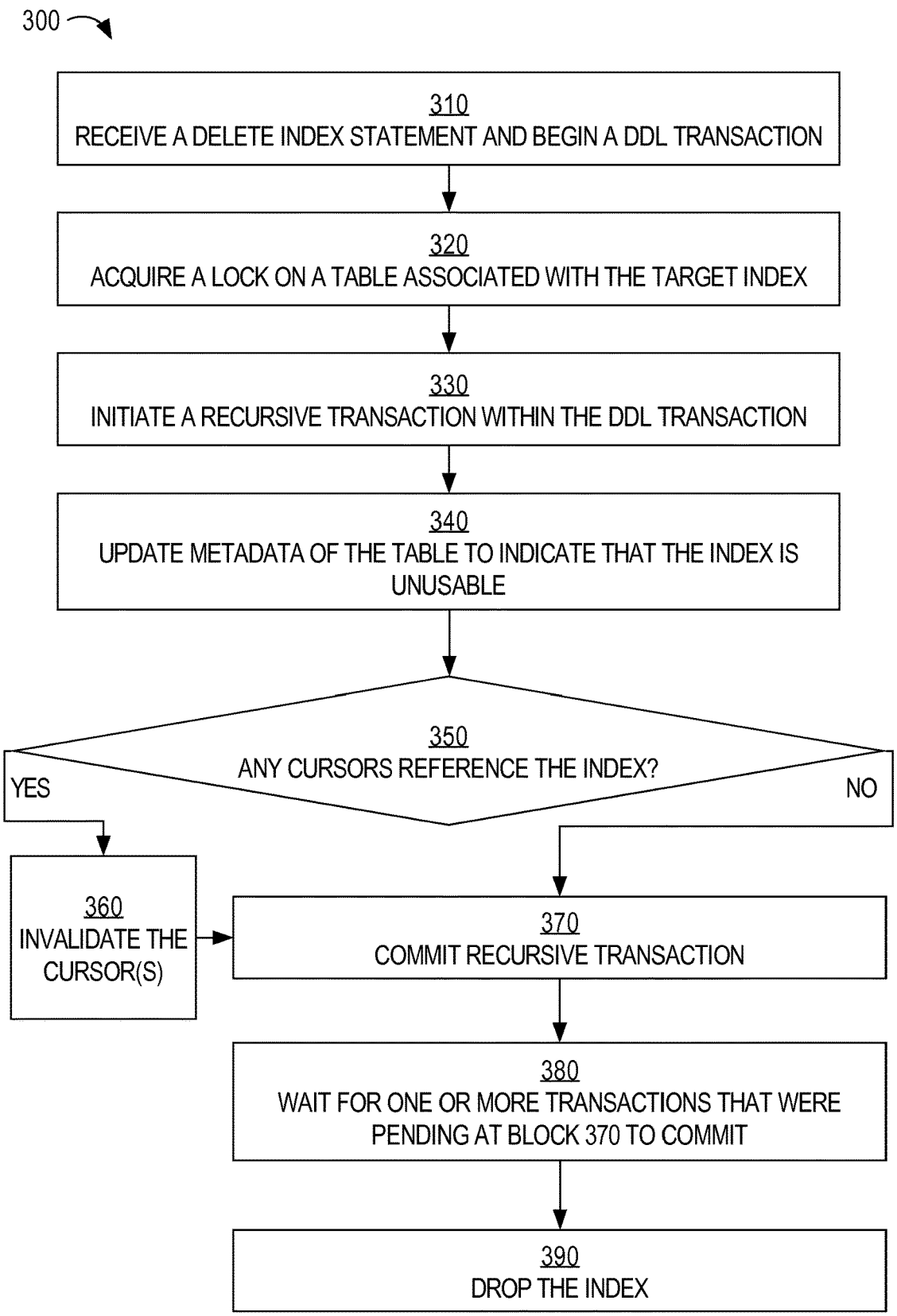
FIG. 3 is a flow diagram that depicts a process for processing a statement that instructs a database server to delete an index, in an embodiment.

FIG. 3 is a flow diagram that depicts a process 300 for processing a statement that instructs a database server to delete an index without requiring any locks that would block DML transactions, in an embodiment.

At block 310, a DELETE INDEX statement is received and a DDL transaction begins. The DELETE INDEX statement indicates an index of a table. If multiple indexes have been created on the table, then the DELETE INDEX statement may specify the target index. If only one index has been created on the table, then the DELETE INDEX statement may specify only the table.

At block 320, the DDL transaction acquires a lock on the table associated with the index. The lock allows other transactions to modify the table, but prevents other transactions from modifying metadata associated with the table.

At block 330, a recursive transaction is initiated. The recursive transaction may be considered a "sub"-transaction of the DDL transaction.

At block 340, metadata for the index is modified to indicate that the index is unusable. Such a modification may involve setting a flag (or bit) that indicates whether the index is usable.

At block 350, it is determined whether any cursors reference the index (or the table). If so, then process 300 proceeds to block 360, where those currors are invalidated. Else, process 300 proceeds to block 370.

At block 370, the recursive transaction (which began at block 330) ends.

At block 380, the DDL transaction waits until all pending transactions that target the table (or the index) have committed. Block 380 may involve determining a timestamp after block 370 has completed and repeatedly determining whether any pending transactions that began prior to the timestamp have committed.

At block 390, after all pending transactions that targeted the table have committed, the index is dropped. Dropping an index involves deleting metadata that indicates that the index exists. Dropping the index may also involve deleting all entries of the index.

Drop Constraint

Constraints allow data that is entered into a column to be restricted in order to ensure that the data is valid or that the data meets certain conditions. For example, a column containing a person's height should only accept positive values, but there may be no data type that accepts only positive values. One way to solve this problem would be to create a constraint that prevents negative numbers from being stored in the column. Constraints can be written to validate any kind of data required. For instance, a constraint can (1) restrict data only to values between 1 and 10; (2) specify that a value must contain at least 5 characters; or (3) specify that a column may not be empty.

Properly written constraints provide users control over data in tables. If an attempt is made to store data in a column that violates a constraint, then an error (or exception) is raised.

Constraints can be defined when a table is first created using, for example, a CREATE TABLE statement or after the table is already created by using, for example, an ALTER TABLE statement.

Disabling a constraint is different than dropping a constraint in that a disabled constraint can be re-enabled through an instruction to modify the constraint. Also, a disabled constraint has extra states, such as validate and no validate, that a dropped constraint does not. Additionally, while a constraint that is disabled is reflected in metadata for a corresponding column or table (although not enforced on the data in the column), column and table metadata does not identify a dropped constraint.

Figure 4A:
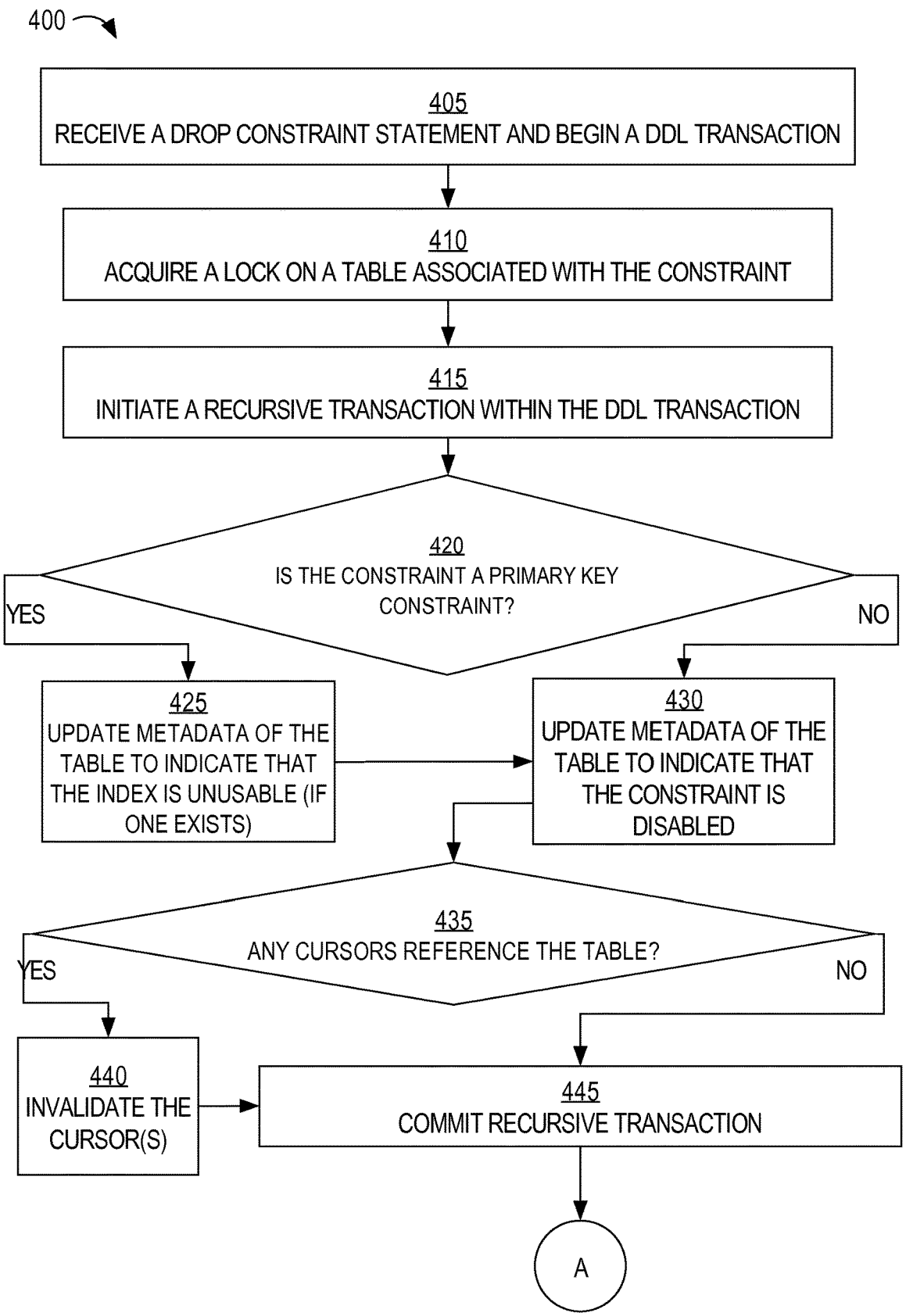
FIGS. 4A-4B are flow diagrams that depict a process for processing a statement that instructs a database server to drop a constraint on a table or column, in an embodiment.
Figure 4B:
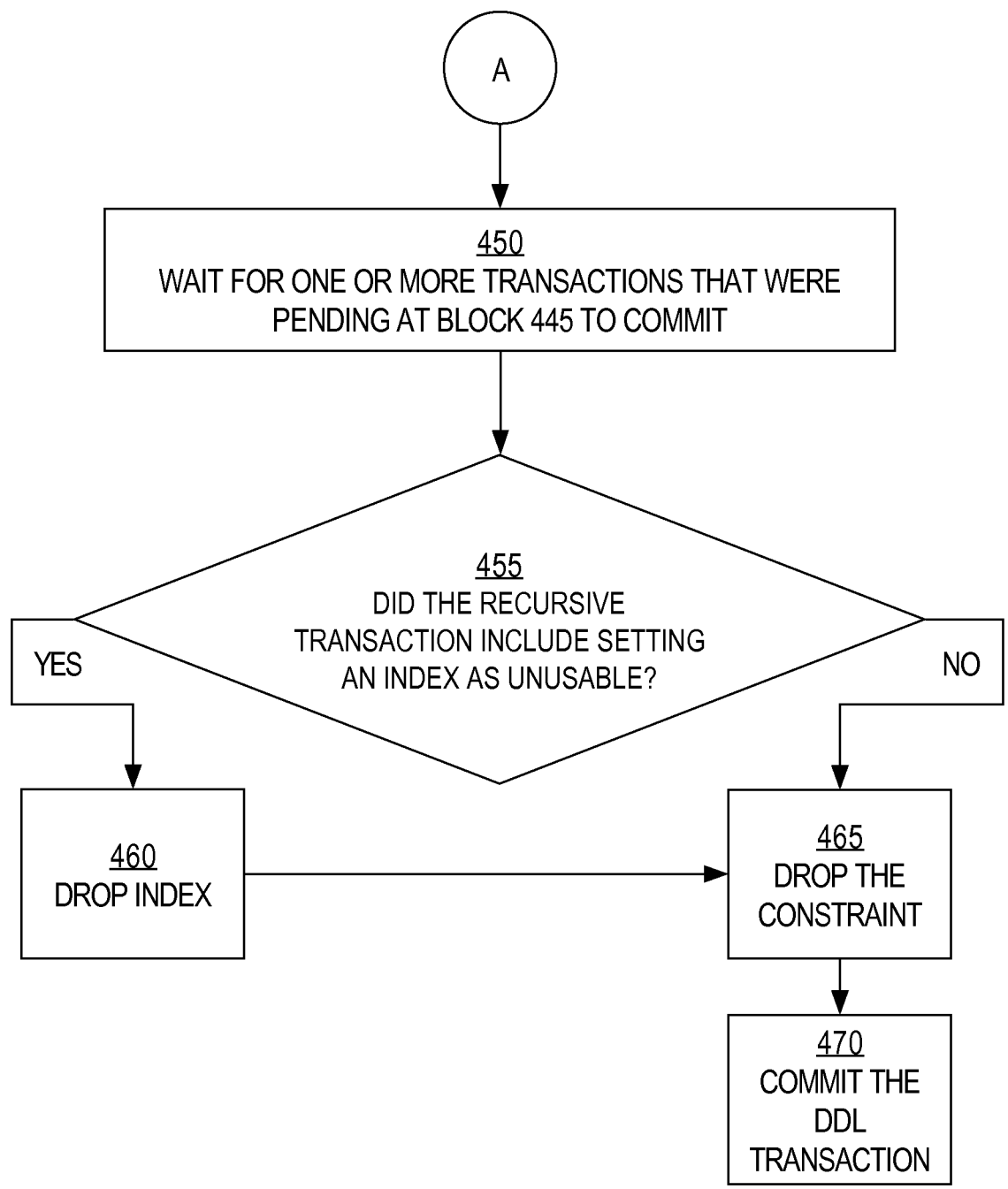

FIGS. 4A-4B are flow diagrams that depict a process 400 for processing a statement that instructs a database server to drop a constraint on a table or column without requiring any locks that would block DML transactions, in an embodiment.

At block 405, a DROP CONSTRAINT statement is received and a DDL transaction begins. The DROP CONSTRAINT statement indicates (e.g., specifies) a column of a table.

At block 410, the DDL transaction acquires a lock on the table associated with the constraint. The lock allows other transactions to modify the table, but prevents other transactions from modifying metadata of the table.

At block 415, a recursive transaction is initiated. The recursive transaction may be considered a "sub"-transaction of the DDL transaction.

At block 420, it is determined whether the constraint is a primary key constraint. A primary key is a unique key defined on a table and is selected to be the key of first importance. Typically, an index is automatically created for a primary key column. Also, there is usually only one primary key on a table.

If it is determined that the column is a primary key column, then process 400 proceeds to block 425. Else, process 400 proceeds to block 430.

At block 425, metadata of the table is modified to indicate that the index is unusable. Any queries that target the table and that are compiled after block 445 (or after the changes to the metadata is made visible) will either (1) "see" that the index is unusable or (2) not "see" the index at all. Block 425 may involve first determining whether an index on the table exists. If an index on the table does not exist, then process 400 may proceed to block 430.

At block 430, metadata of the table is modified to indicate that the constraint on the column is disabled.

At block 435, it is determined whether there are one or more cursors that target the table (or the column) are invalidated. If so, process 400 proceeds to block 440 where the one or more cursors are invalidated. Else, process 400 proceeds to block 445.

At block 445, the recursive transaction (which began at block 415) ends.

At block 450, the DDL transaction waits until all pending transactions that target the table (or the column) have committed. Block 450 may involve determining a timestamp after block 445 has completed and repeatedly determining whether any pending transactions that began prior to the timestamp have committed.

At block 455, after all pending transactions that targeted the table have committed, it is determined whether the recursive transaction included setting an index as unusable. If so, then process 400 proceeds to block 460, where the index is dropped.

At block 465, the constraint is dropped. A result of dropping a constraint is that the constraint will not be enforced when subsequent database statements (e.g., inserts or updates) that target the corresponding column are processed. For example, a constraint may be that values in a column can only be five numerical digits. While the constraint is enabled, inserts of data into that column first require a determination of whether the data satisfies the constraint. If not, an exception may be thrown or raised and any values that do not satisfy the constraint are not inserted into the column. After the constraint is dropped, values that are greater than or less than five numerical digits do not satisfy the constraint may be inserted into the column.

At block 470, the DDL transaction that began in block 405 commits.

Set Column Unused

As noted previously, setting a column as unused is an example of a destructive DDL statement. Setting a column unused does not modify the data blocks that store the column data. In fact, the column data remains in storage. Instead, the table definition for the table that includes the column is modified to indicate that the column is unusable. Thus, any database statements that target the table will "see" that the column is unusable and will not attempt to retrieve data from storage. One advantage of setting a column as unused compared to removing or deleting the column entirely is that the latter operation requires a significant amount of processing to update all the data blocks by removing the column data and shifting data from one or more other columns.

Figure 5A:
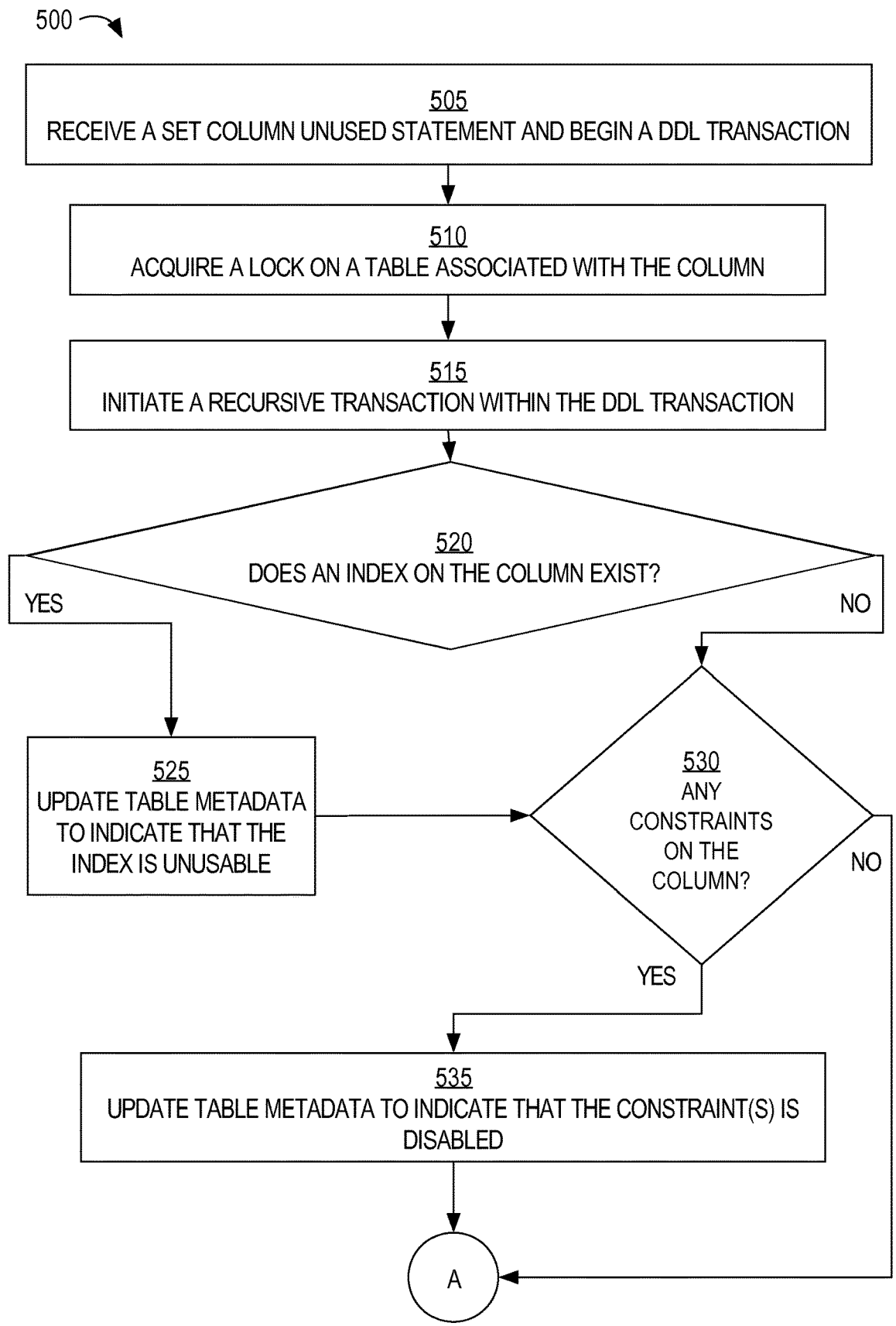
FIGS. 5A-5C are flow diagrams that depict a process for processing a statement that instructs a database server to set a column as unusable, in an embodiment.
Figure 5B:
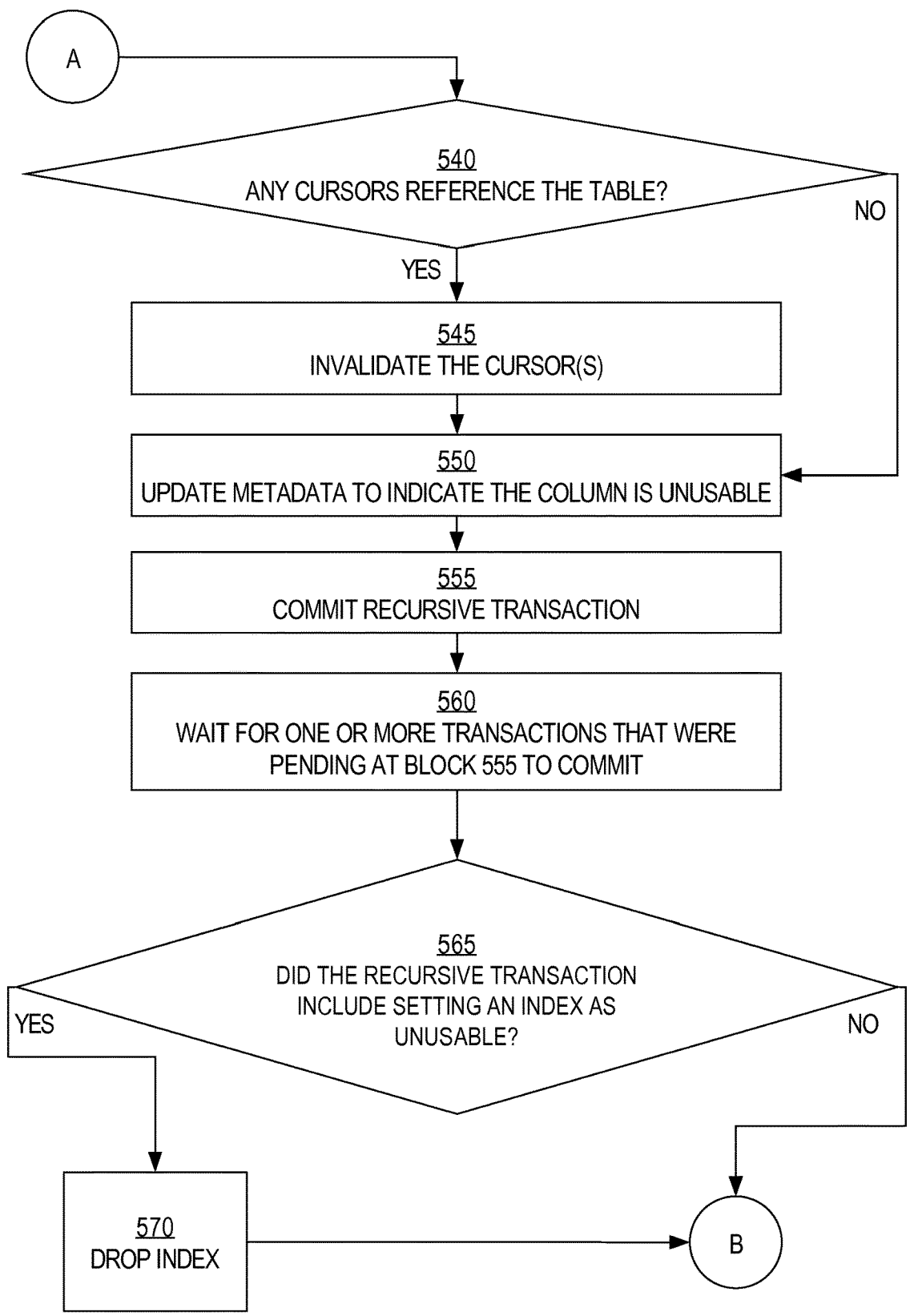
Figure 5C:
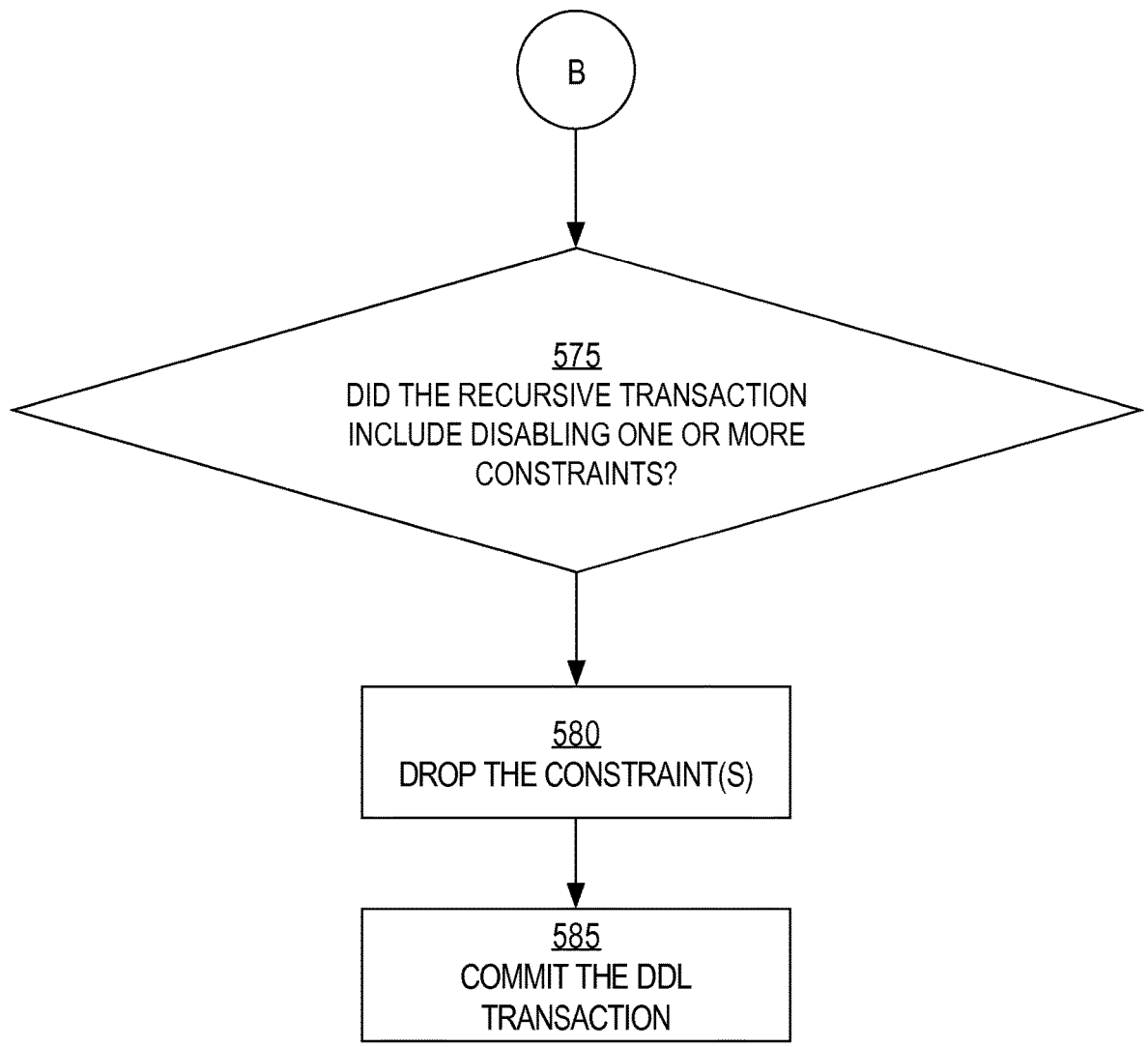

FIGS. 5A-5C are flow diagrams that depict a process for processing a statement that instructs a database server to set a column as unusable without requiring any locks that would block DML transactions, in an embodiment.

At block 505, a SET COLUMN UNUSED statement is received and a DDL transaction begins. The SET COLUMN UNUSED statement indicates a column of a table.

At block 510, the DDL transaction acquires a lock on the table associated with the index. The lock allows other transactions to modify the table, but prevents other transactions from modifying metadata of the table.

At block 515, a recursive transaction is initiated. The recursive transaction may be considered a "sub"-transaction of the DDL transaction.

At block 520, it is determined whether an index on the column exists. If so, then process 500 proceeds to block 525. Else, process 500 proceeds to block 530.

At block 525, metadata of the table is modified to indicate that the index is unusable. Any queries that target the table and that are compiled after block 555 (or after the changes to the metadata are made visible) will either (1) "see" that the index is unusable or (2) not "see" the index at all.

At block 530, it is determined whether a constraint on the column exists. If so, then process 500 proceeds to block 535. Else, process 500 proceeds to block 540.

At block 535, metadata of the table is modified to indicate that the constraint on the column is disabled. Such metadata may reside in a table dictionary that stores metadata for one or more tables stored in a database.

At block 540, it is determined whether one or more cursors that target the table (or the column) were invalidated. If so, process 500 proceeds to block 545 where the one or more cursors are invalidated. Else, process 500 proceeds to block 550. If it is determined whether a cursor targets a table rather than determining whether the cursor targets the column, then the cursor may be invalidated unnecessarily since the cursor may not request data from the column.

At block 550, metadata of the table is modified to indicate that the column is unusable.

At block 555, the recursive transaction (which began at block 515) ends. Any database statements that target the table and are processed in a transaction that begins after this block will "see" that the column is unusable and will be processed accordingly. For example, if a database statement queries the table and requests that all the data in the table be returned, then no data from the "unused" column will be returned.

At block 560, the DDL transaction waits until all pending transactions that target the table have committed. Block 560 may involve determining a timestamp after block 555 has completed and repeatedly determining whether any pending transactions that began prior to the timestamp have committed.

At block 565, after all pending transactions that targeted the table have committed, it is determined whether the recursive transaction included setting an index as unusable. If so, then process 500 proceeds to block 570, where the index is dropped.

At block 575, after all pending transactions that targeted the table have committed, it is determined whether the recursive transaction involved disabling one or more constraints. If so, then process 500 proceeds to block 580, where each of the one or more constraints is dropped.

At block 585, the DDL transaction that began at block 505 commits.

Figure 1:
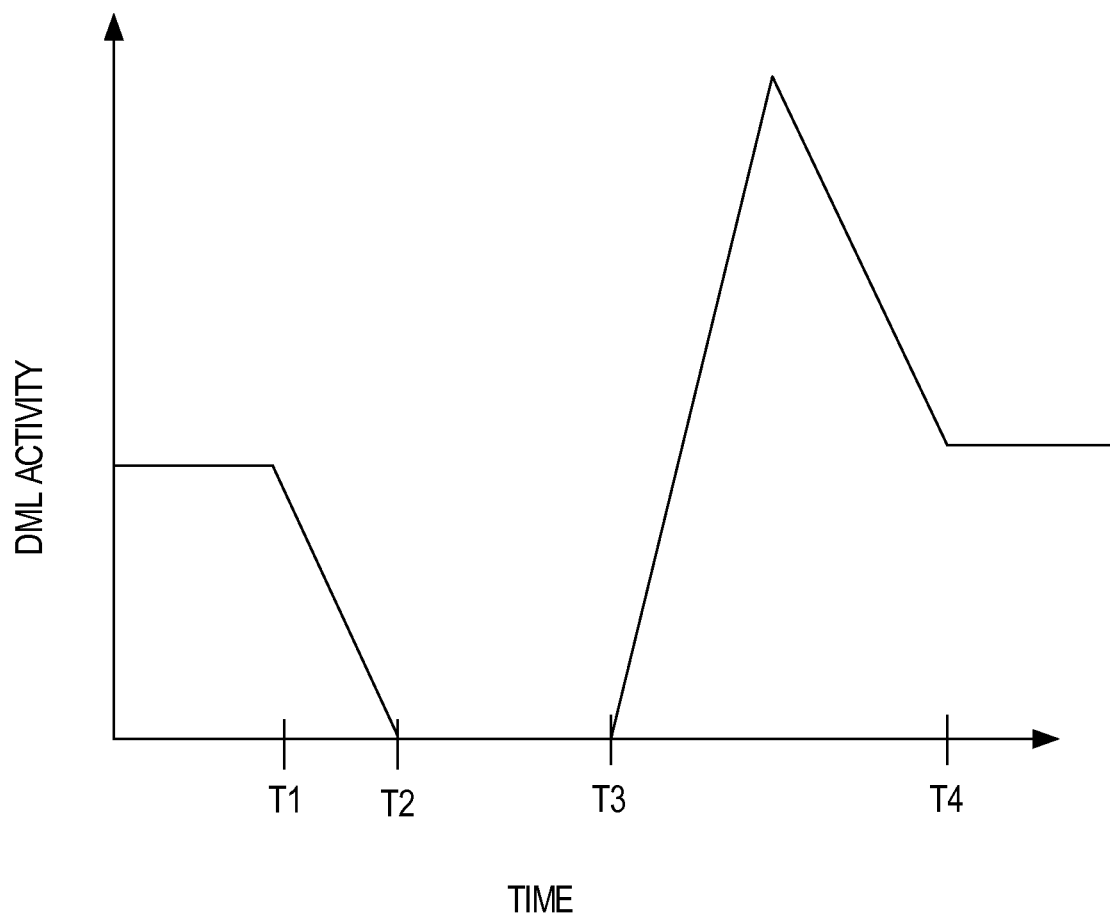
FIG. 1 is a graph that illustrates the effect on DML activity that a "destructive" DDL statement has when processed.

By processing destructive DDL statements as described herein, blocking locks on a table are not required. Thus, DML statements that are concurrently executing with respect to a destructive DDL statement are not blocked on the DDL statement. As a result (and in contrast to FIG. 1), DML activity is not affected using techniques described herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
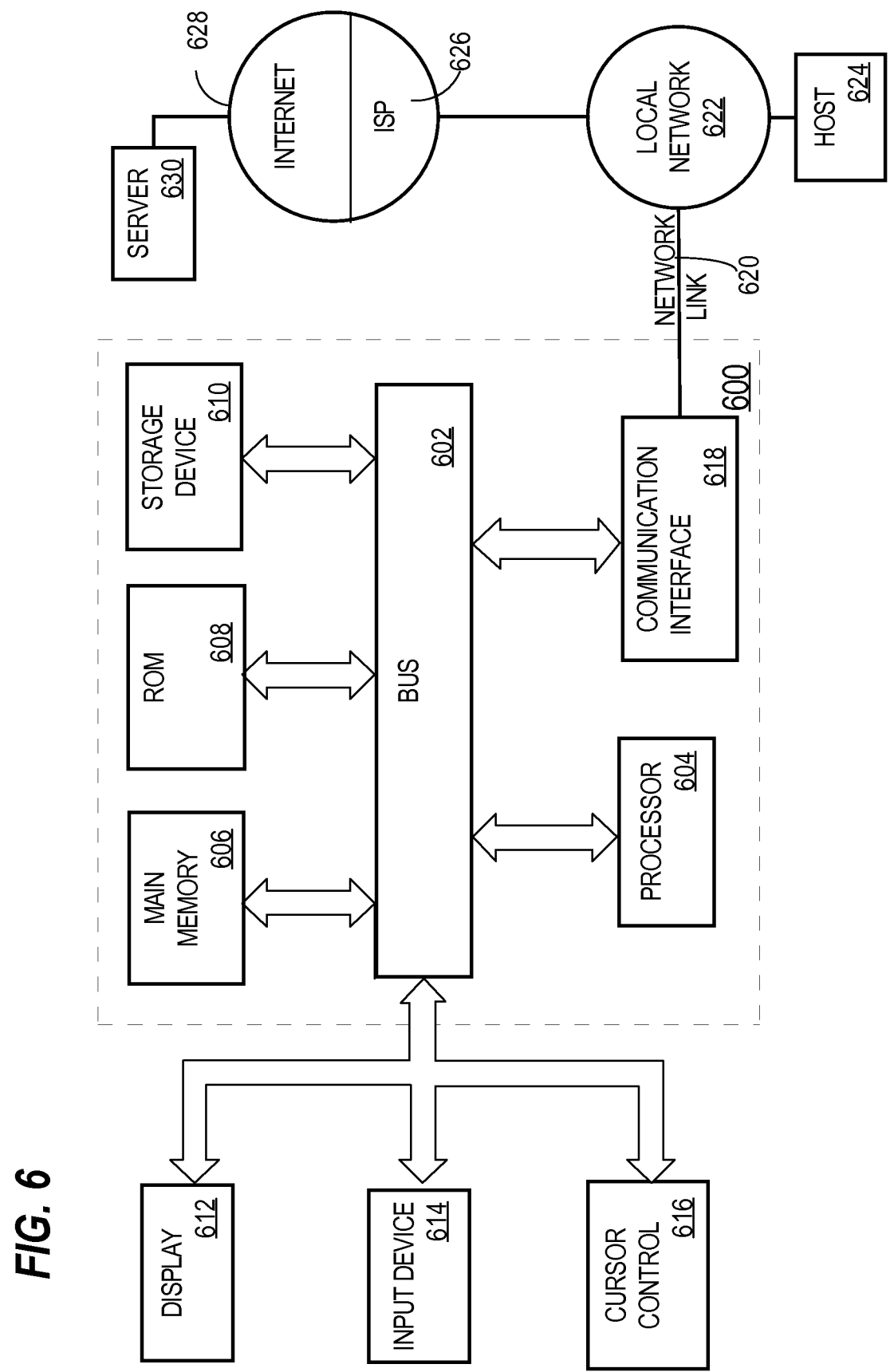
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving an instruction to modify metadata that is associated with a column of a table;
   in response to receiving the instruction:
      initiating a first transaction;
      after initiating the first transaction and before committing the first transaction:
         acquiring a lock on the table;
         initiating a second transaction within the first transaction;
         after initiating the second transaction, storing data that indicates that a constraint is disabled;
         committing the second transaction;
         after committing the second transaction and before committing the first transaction:
            determining a particular timestamp;
            waiting for one or more transactions that are pending at a time associated with the particular timestamp to commit;
            in response to determining that the one or more transactions have committed, dropping the constraint;
         committing the first transaction;
   wherein the method is performed by one or more computing devices.

2. The method of claim 1, wherein the instruction is to drop the constraint of the column of the table.

3. The method of claim 2, further comprising:
   determining whether the constraint is a primary key constraint;
   in response to determining that the constraint is a primary key constraint, modifying index metadata of the table to indicate that an index associated with the column is unusable.

4. The method of claim 1, wherein:
   the instruction is to set the column unused;
   the method further comprising, prior to determining the particular timestamp, storing second data that indicates that the column is unusable.

5. The method of claim 4, further comprising:
   prior to determining the particular timestamp, determining whether the constraint on the column exists;
   wherein storing the data comprises storing the data that indicates that the constraint is disabled in response to determining that the constraint on the column exists.

6. The method of claim 1, further comprising:
   in response to receiving the instruction and prior to determining the particular timestamp:
      determining whether an index exists on the column;
      if it is determined that an index exists on the column, then storing index data that indicates that the index is unusable;
   in response to determining that the one or more transactions have committed, dropping the index if it is determined that the index exists.

7. The method of claim 1, further comprising:
in response to receiving the instruction and prior to determining the particular timestamp, invalidating one or more cursors.

8. The method of claim 1, wherein waiting comprises calling a function that takes, as input, the particular timestamp and an object identifier that identifies the column or the table.

9. One or more non-transitory computer-readable media storing instructions which, when executed by one or more processors, cause:
receiving an instruction to modify metadata that is associated with a column of a table;
in response to receiving the instruction:
initiating a first transaction;
after initiating the first transaction and before committing the first transaction:
acquiring a lock on the table;
initiating a second transaction within the first transaction;
after initiating the second transaction, storing data that indicates that a constraint is disabled;
committing the second transaction;
after committing the second transaction and before committing the first transaction:
determining a particular timestamp;
waiting for one or more transactions that are pending at a time associated with the particular timestamp to commit;
in response to determining that the one or more transactions have committed, dropping the constraint;
committing the first transaction.

10. The one or more non-transitory computer-readable media of claim 9, wherein the instruction is to drop the constraint of the column of the table.

11. The one or more non-transitory computer-readable media of claim 10, wherein the instructions, when executed by the one or more processors, further cause:
determining whether the constraint is a primary key constraint;
in response to determining that the constraint is a primary key constraint, modifying index metadata of the table to indicate that an index associated with the column is unusable.

12. The one or more non-transitory computer-readable media of claim 9, wherein:
the instruction is to set the column unused;
the instructions, when executed by the one or more processors, further cause, prior to determining the particular timestamp, storing second data that indicates that the column is unusable.

13. The one or more non-transitory computer-readable media of claim 12, wherein the instructions, when executed by the one or more processors, further cause:
prior to determining the particular timestamp, determining whether the constraint on the column exists;
wherein storing the data comprises storing the data that indicates that the constraint is disabled in response to determining that the constraint on the column exists.

14. The one or more non-transitory computer-readable media of claim 9, wherein the instructions, when executed by the one or more processors, further cause:
in response to receiving the instruction and prior to determining the particular time stamp:
determining whether an index exists on the column;
if it is determined that an index exists on the column, then storing index data that indicates that the index is unusable;
in response to determining that the one or more transactions have committed, dropping the index if it is determined that the index exists.

15. The one or more non-transitory computer-readable media of claim 9, wherein the instructions, when executed by the one or more processors, further cause:
in response to receiving the instruction and prior to determining the particular timestamp, invalidating one or more cursors.

16. The one or more non-transitory computer-readable media of claim 9, wherein waiting comprises calling a function that takes, as input, the particular timestamp and an object identifier that identifies the column or the table.

* * * * *

UNITED STATES PATENT AND TRADEMARK OFFICE
CERTIFICATE OF CORRECTION

PATENT NO. : 10,698,723 B2
APPLICATION NO. : 14/231416
DATED : June 30, 2020
INVENTOR(S) : Kumar et al.

Page 1 of 1

It is certified that error appears in the above-identified patent and that said Letters Patent is hereby corrected as shown below:

In the Specification

In Column 6, Line 48, delete "currors" and insert -- cursors --, therefor.

In the Claims

In Column 14, Line 23, in Claim 14, delete "time stamp:" and insert -- timestamp: --, therefor.

Signed and Sealed this
First Day of June, 2021

Drew Hirshfeld
*Performing the Functions and Duties of the
Under Secretary of Commerce for Intellectual Property and
Director of the United States Patent and Trademark Office*